United States Patent [19]

Herndon

[11] Patent Number: 4,899,961
[45] Date of Patent: Feb. 13, 1990

[54] INFLATABLE, LATERAL HEAD RESTRAINT

[75] Inventor: Gerald F. Herndon, Bellevue, Wash.

[73] Assignee: The Boeing Company, Seattle, Wash.

[21] Appl. No.: 212,572

[22] Filed: Jun. 28, 1988

[51] Int. Cl.$^4$ .............................................. B64D 25/04
[52] U.S. Cl. ............................... 244/122 AG; 297/397
[58] Field of Search ....... 244/122 R, 122 A, 122 AG,
244/122 B, 121; 297/391, 397, 398, 406, 410,
216; 280/728, 730, 748, 753

[56] References Cited

U.S. PATENT DOCUMENTS

| | | | |
|---|---|---|---|
| 2,582,571 | 1/1952 | Thoma | 297/397 |
| 3,179,360 | 4/1965 | Shelton et al. | 244/122 B |
| 3,218,103 | 11/1965 | Boyce . | |
| 3,645,259 | 2/1972 | Schulman . | |
| 3,953,049 | 4/1976 | Surace et al. . | |
| 4,017,118 | 4/1977 | Cawley | 297/391 |
| 4,205,878 | 6/1980 | Wooten . | |
| 4,359,200 | 11/1982 | Brevard et al. | 244/122 AG |
| 4,466,662 | 8/1984 | McDonald et al. | 297/391 |
| 4,565,405 | 1/1986 | Mayer | 297/397 |

FOREIGN PATENT DOCUMENTS

| | | |
|---|---|---|
| 0142822 | 11/1984 | European Pat. Off. . |
| 1060701 | 4/1954 | France .......................... 244/122 B |
| 1411528 | 2/1974 | United Kingdom . |

Primary Examiner—Gale L. Barefoot
Attorney, Agent, or Firm—Seed and Berry

[57] ABSTRACT

A lateral head restraint system providing support to a pilot's head during ejection or high-acceleration flight maneuvers. The lateral head restraint system includes inflating bladders positioned on opposite sides of a pilot's head. The bladders inflate from a compressed wedge position, sweeping through an arc on each side of the headrest structure. Inflation of the bladders centers the pilot's head into the correct control position and restricts lateral movement. When fully inflated, the bladders permit the pilot to lean forward or turn his head to either side. Further, an unobstructed field of vision is provided. The lateral head restraint system is incorporated into the ejection seat and remains fully operational during the ejection procedure to protect the pilot's head from injury.

16 Claims, 3 Drawing Sheets

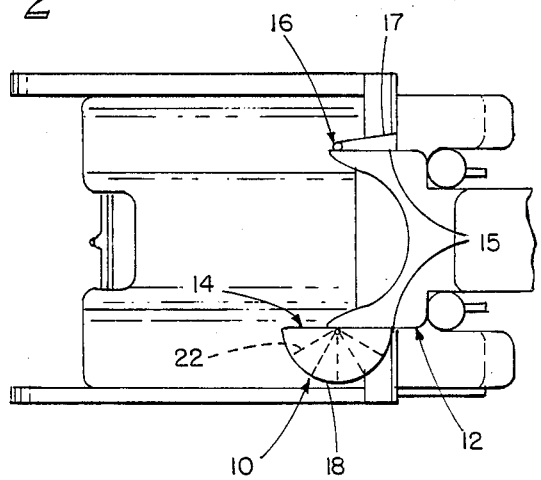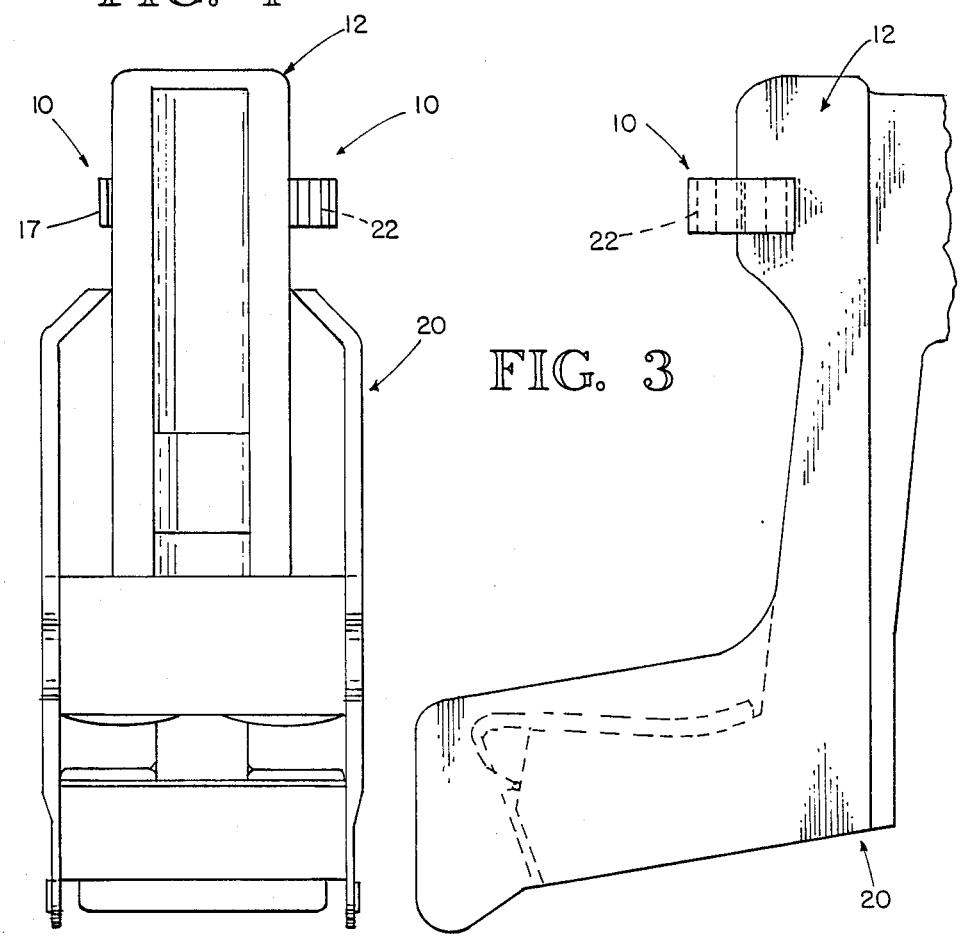

INFLATABLE, LATERAL HEAD RESTRAINT

TECHNICAL FIELD

This invention relates to a lateral head restraint for a pilot, and more particularly, to a pair of rapidly inflating bladders which restrain and center the pilot's head.

BACKGROUND ART

The increased maneuvering capability of present and future high-performance military aircraft imposes greater accelerations on the crew members than previous aircraft. These accelerations affect different portions of a pilot's body, particularly his head.

The pilot's head may be laterally displaced during a sharp turn or other flight maneuver. This may result in injury or make it difficult for the pilot to maintain his head in the proper position. Repeated lateral displacement of the pilot's head causes muscle strain and fatigue.

Many military aircraft include a "heads-up" display to provide instrument panel and weapons system information to the pilot. The information is electronically displayed and reflected into the pilot's view using various techniques and/or mirrors. Maintaining the proper head position is important for effective use of these display systems.

Lateral head displacement with the resultant problems sometimes occurs for racecar drivers. A solution used by racecar drivers is to attach a lanyard from their shoulders to the helmets to help react the lateral force on their heads resulting from the centripetal acceleration experienced in high-speed turns. This solution is not appropriate for aircraft pilots for numerous reasons. The aircraft pilot must have considerable freedom of movement to view the instrument panel as well as for checking aft and leaning forward.

European Patent No. 142,822 describes a padded headrest having sides that pivot about a point to swing against the passenger's head in the event the passenger's head is forced against a specific point on the back of the headrest. This type of headrest has the disadvantage of requiring the user's head to be in the correct position to trigger the device. British Patent No. 1,411,528, to Matthews, describes an inflatable cushion or pillow for use as a headrest. Such a headrest has many disadvantages, including not rapidly inflating nor serving to center the user's head during inflation. U.S. Pat. Nos. 3,218,103, to Boyce, and 3,953,049, to Surace et al., describe inflatable devices that, when in use, enclose the user's head. U.S. Pat. No. 3,645,259, to Schulman, describes an inflatable bag positioned beneath the pilot's chin which quickly inflates to a position between the chin and the chest of the pilot. U.S. Pat. No. 4,205,878, to Wooten, describes a seat with manually extendable headrests. U.S. Pat. No. 4,466,662, to McDonald et al., describes a headrest system for use in an aircraft. This headrest system is electrohydraulically actuated and controlled by the pilot in a variety of positions. This headrest has solid headrest pads 26 against which the back of the pilot's head rests.

DISCLOSURE OF THE INVENTION

It is an object of the invention to provide a rapidly inflating head restraint device that aids in centering the head of the pilot.

It is another object of the invention to provide a head restraint device which restricts lateral movement of the pilot's head while permitting the pilot to have a large field of vision and to move his head as desired.

It is another object of the invention to provide a head restraint device which is compactly stored in the retracted position.

It is another object of the present invention to provide a lateral head restraint which is repeatedly usable.

These and other objects of the invention are accomplished by mounting two air-inflated bladders on an ejection seat on opposite sides of a pilot's head. When the bladders are inflated they center and laterally restrain pilot's head. In the noninflated condition, the bladders are compressed and thus retracted adjacent the ejection seat. The bladders are inflated from engine bleed air or a gas cartridge. During inflation, the bladder swings through a semicircular, 180° arc, acting to center the pilot's head. When lateral accelerations act on the pilot's head, the bladders provide lateral restraint support to aid the pilot in retaining his head in the proper position. The bladders are shaped and positioned such that the vision of the pilot is not obstructed. The pilot may lean forward or turn his head to either side, thus permitting a full range of vision in all directions.

BRIEF DESCRIPTION OF THE DRAWINGS

FIG. 2 is a top plan view of the lateral head restraint system on an ejection seat.

FIG. 3 is a side elevational view of the seat and lateral head restraint.

FIG. 4 is a front elevational view of the seat and lateral head restraint.

BEST MODE FOR CARRYING OUT THE INVENTION

Figure 1:
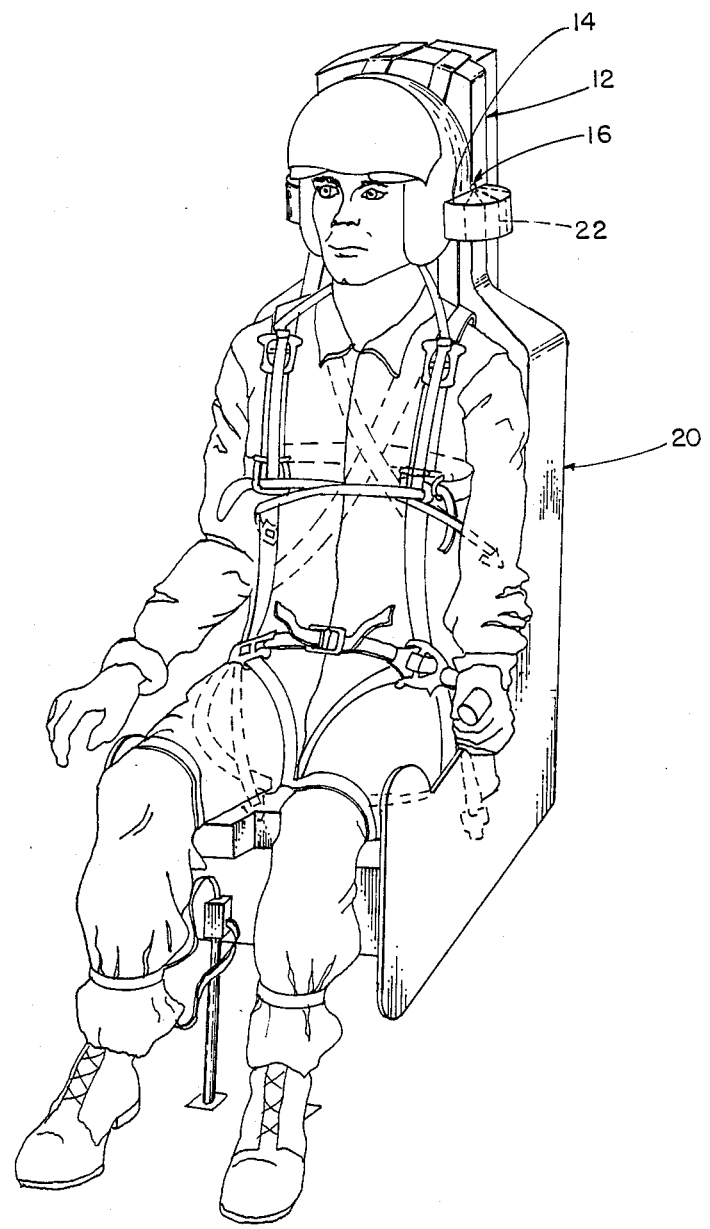
FIG. 1 is an isometric view of a pilot and the inflated head restraints.

The lateral head restraints, denoted generally as 10, are shown in FIG. 1 in the inflated position adjacent the pilot's head. The lateral head restraint includes two inflatable bladder assemblies 17 and 18 made of interconnected pie-shaped segments. The seat 20 has a headrest portion 12 providing support for the back of the pilot's head. The rear face 15 of the bladders is securely connected to the headrest portion. The front face 14 and other portions of the bladder are movable with respect to the rear face. The bladders are solidly connected at a pivoting point 16 at the forward portion of the headrest structure. In the inflated position, the front face 14 of the bladders is closely adjacent to or abuts against the pilot's helmet to provide restraining support of the pilot's head.

The bladders provide a firm restraining support for the pilot's head. In the event of a rapid lateral acceleration, the pilot's head is restrained from significant movement by abutting against the inflated bladders 17 and 18. This aids the pilot in keeping his head properly positioned to view the instrument panel and heads-up display system of the aircraft. The lateral head restraint system also reduces muscle fatigue and likelihood of injury.

The field of vision remains unobstructed on either side and the pilot is permitted a full range of head movement. The pilot may look upward, turn his head to either side, or lean forward and turn to view in the aft position, if desired. The horizontal position of the bladders with respect to the pilot's head may be adjusted up or down according to the pilot's size or desired contact point on the helmet.

An inflated bladder assembly 18 and an uninflated bladder assembly 17 are shown in FIGS. 2 and 4. The uninflated bladder 17 is held securely against the headrest structure 12, with the front face 14 adjacent the rear face 15. The bladder is secured at point 16, about which the bladder pivots or swings forward as it inflates. The bladder is securely connected at the rear face 15 to the ejection seat headrest portion. Air line 19 is connected to the bladder for inflating the bladder with air. As the bladder inflates, the rear face 15 remains firmly fixed to the ejection seat and the front face 14 extends forward from a position adjacent the rear face to a position adjacent the side of the pilot's head.

Threads 22 ensure that each of the bladder segments conforms to a predetermined shape when fully inflated and that it inflates in a known, uniform manner. When the bladder is fully inflated, a preloaded tension is placed on the threads. The higher the air pressure, the greater the preload tension. The internal threads at an inner radius near the point 16 are shorter than the threads near the outer radius. Because the threads are preloaded in tension, the bladder structure becomes very firm. The bladder cannot be compressed unless this preload tension is overcome. This results in a lateral head restraint structure that is very hard and more similar to a stiff, rigid member than to a cushion or balloon. The bladder is also made of a material to provide this stiff, rigid support when fully inflated.

Figure 5:
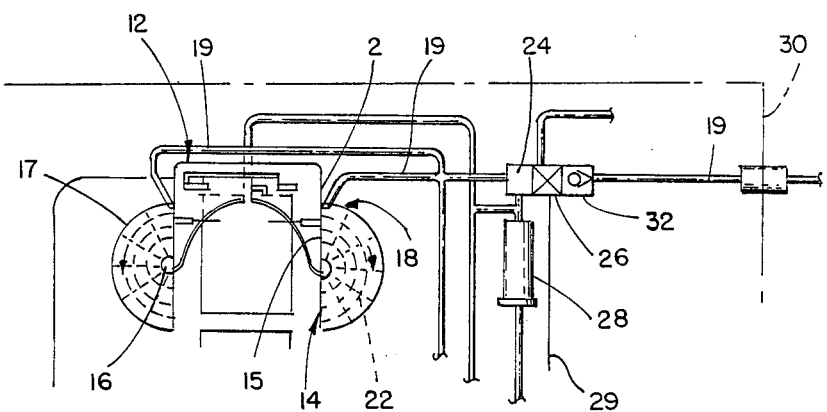
FIG. 5 is a top plan view illustrating the inflating system for the lateral head restraints.

The method of operation of the lateral head restraint is as follows. The bladders 17 and 18 are stored positioned against the ejection seat headrest prior to being inflated, as illustrated by bladder 17 in FIGS. 2 and 4. In this position, the bladders are compressed and firmly secured in position. In response to an external signal, pressurized air is forced into the bladders, causing them to inflate. As the bladders inflate, they sweep from a position behind the pilot's head through a 180-degree arc. The front face 14 comes from the side of the headrest to a position adjacent the pilot's head, as shown in FIGS. 1 and 5. As the bladders sweep through this arc, they provide a centering force for the pilot's head. In the event the pilot has been subjected to a lateral acceleration and his head is on one side of the seat, the inflating bladders will assist in centering his head during inflation. This occurs as forward sweeping surface 14 of the bladder contacts the rear or side of the helmet and exerts a force on it to position it towards the center of the headrest structure 12. This is particularly helpful if the lateral acceleration being experienced is great and the pilot has difficulty moving his head back to the center position.

The lateral head restraint bladders are inflated from engine bleed air through valve 24, as shown in FIG. 5. The bladders may also be inflated by a gas cartridge 28 provided as part of the emergency ejection system. In the event of an emergency ejection, the bladders are inflated by a gas cartridge 28 at a much higher rate of speed than the bleed air inflation rate. The inflating of the bladders may be triggered automatically according to acceleration experienced by the pilot or aircraft. Appropriate sensors are placed in the seat or other locations, as desired, to sense movement or accelerations. The lateral head restraints are also inflatable by a manual switch. This may be part of the combat condition readiness system or the emergency ejection system.

Control of the valves to inflate or deflate the head restraints is provided by control line 29.

The bladders 17 and 18 are deflated when not in use. The bladders 17 and 18 may deflate automatically within a certain time period after accelerations are below a determined level. Alternatively, the bladders are deflatable manually by the pilot. An air evacuation device 26 is provided in the control valve assembly to evacuate air from the device to ensure complete retraction.

The lateral head restraint system is an integral part of the pilot's seat and remains attached with the bladders inflated even after ejection of the pilot from the craft. A disconnection point 30 is provided to permit disconnection of the system from the rest of the aircraft during ejection. A check valve 32 ensures that the bladders remain inflated during this procedure. The lateral head restraints provide support during the ejection procedure to avoid injury to the pilot from the acceleration forces that may occur during ejection.

I claim:

1. A lateral head restraint comprising:
   a seat having a headrest portion, said headrest portion having a right side and a left side corresponding to a right side and a left side of a user's head;
   two inflatable bladders, each having a rear face attached to said headrest portion and a movable front face, one of said bladders being attached on each of said sides of said headrest portion, said bladders having threads therein causing said bladders to assume a predetermined shape when fully inflated;
   means for simultaneously and rapidly inflating said bladders, causing said front faces to be positioned adjacent respective opposite sides of said user's head; and
   a pivot means for reach of said respective bladders for permitting said bladder to pivot as it is inflated, said pivot means being coupled to said headrest portion and positioned aft of a user's eyes, said front face of said bladder being positioned aft of said pivot means and adjacent said rear face when said bladders are not inflated, said front face pivoting about said pivot means during inflation, said front face being spaced from said rear face and being positioned forward of said pivot and adjacent the side of said user's head when said bladder is inflated.

2. The apparatus according to claim 1 wherein said bladders have a semicircular cross section.

3. The apparatus according to claim 2 wherein said front faces pivot about respective axes secured to said headrest position.

4. The apparatus according to claim 3 wherein said axes are vertical.

5. The apparatus according to claim 1 wherein said bladders move through a position away from said user's head to a position adjacent said user's head while being inflated.

6. The apparatus according to claim 5 wherein said bladders contact said user's head while being inflated to move said user's head to a centered position between said bladders.

7. The apparatus according to claim 1 wherein said threads are preloaded in tension when said bladders are fully inflated to create a stiff member for providing said lateral head restraint.

8. The apparatus according to claim 1 wherein said means to inflate said bladders includes engine bleed air.

9. The apparatus according to claim 1 wherein said means to inflate said bladders includes a compressed air cartridge.

10. The apparatus according to claim 1, further including an evacuation means for removing air from said bladders.

11. The apparatus according to claim 8, further including means for repeatedly inflating and deflating the bladders under the control of the user.

12. The method of restraining a user's head, comprising:
 providing a seat including a headrest portion;
 providing two air-inflatable bladders, each having a rear face securely attached to said headrest portion and a front face movable with respect to said headrest portion; and
 inflating said bladders simultaneously thereby, causing said front face of said bladders to move from a position adjacent said headrest portion to a position adjacent a temple region of said user's head to provide restraining support to said user's head.

13. The method according to claim 12, further including the step of moving said front face of the bladders through a semicircular arc to center said user's head while said bladders are being inflated.

14. The method according to claim 12 wherein said bladders pivot about respective axes while they are being inflated.

15. The method according to claim 12, further including the step of removing air from said bladders to retract them.

16. The method according to claim 12 wherein the bladders remain inflated during an ejection procedure.

* * * * *

UNITED STATES PATENT AND TRADEMARK OFFICE
CERTIFICATE OF CORRECTION

PATENT NO. : 4,899,961
DATED : February 13, 1990
INVENTOR(S) : Gerald F. Herndon It is certified that error appears in the above-identified patent and that said Letters Patent is hereby corrected as shown below:

In claim 1, column 4, line 37, delete "reach" and substitute therefor --each--.

Signed and Sealed this

Twenty-eighth Day of May, 1991

Attest:

HARRY F. MANBECK, JR.

Attesting Officer

Commissioner of Patents and Trademarks